Patented Nov. 28, 1922.

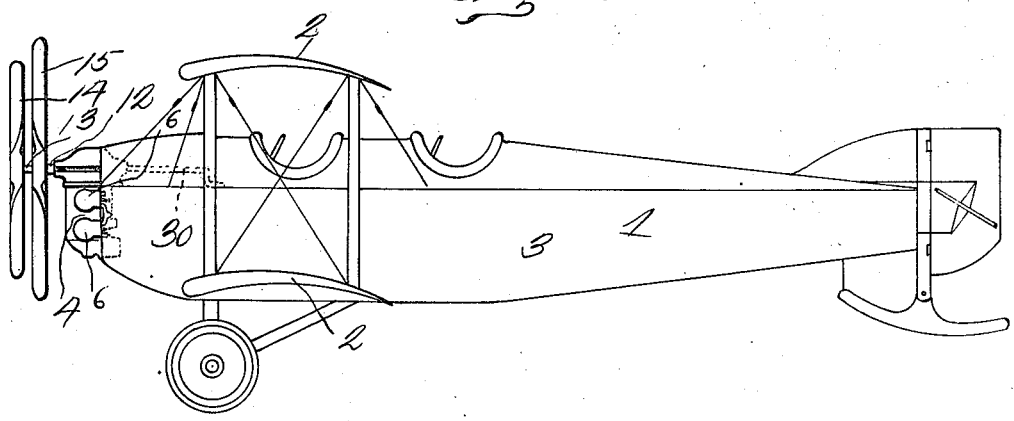
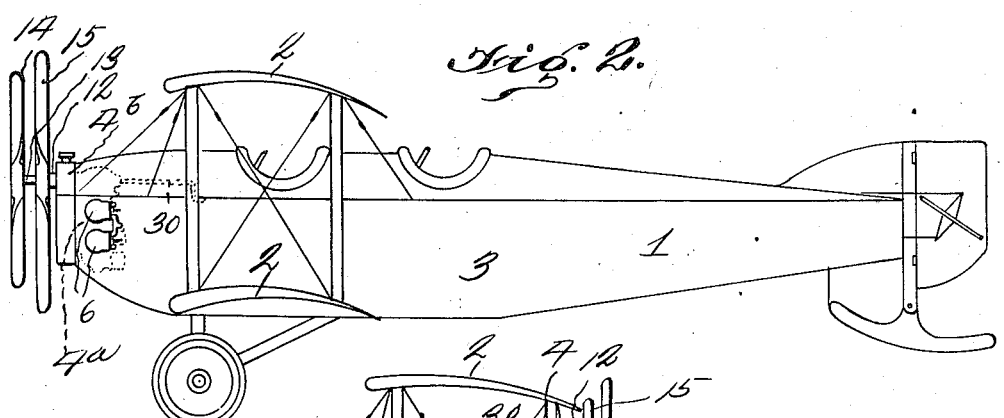
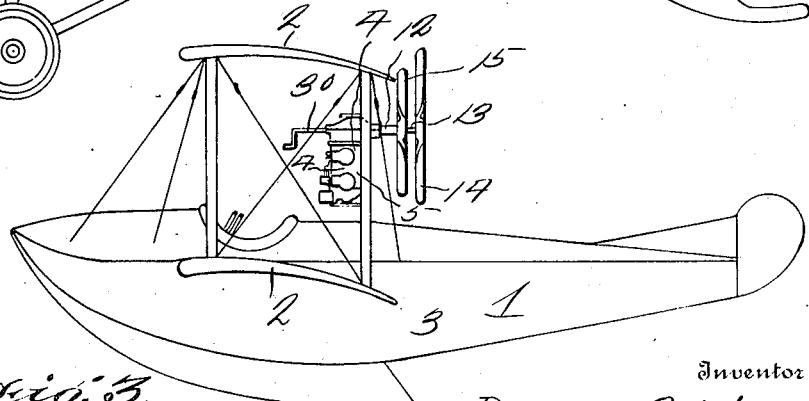

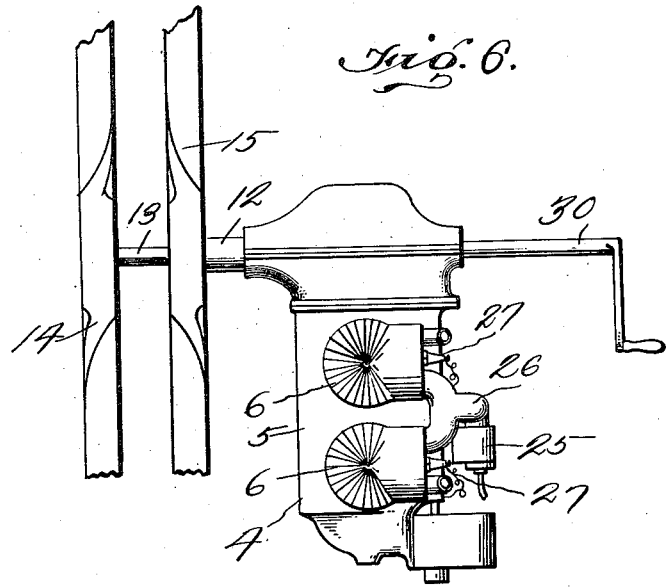
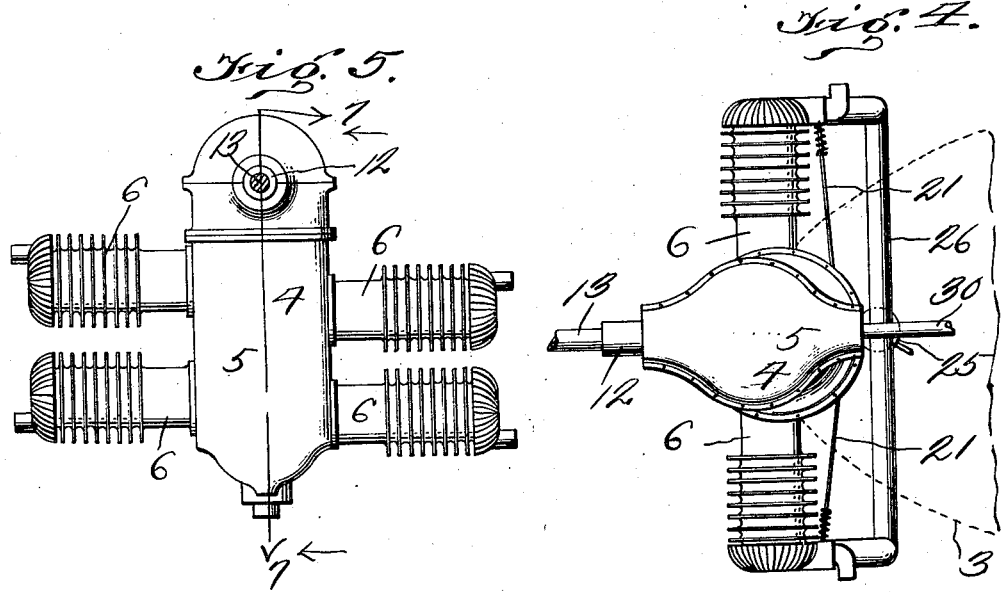

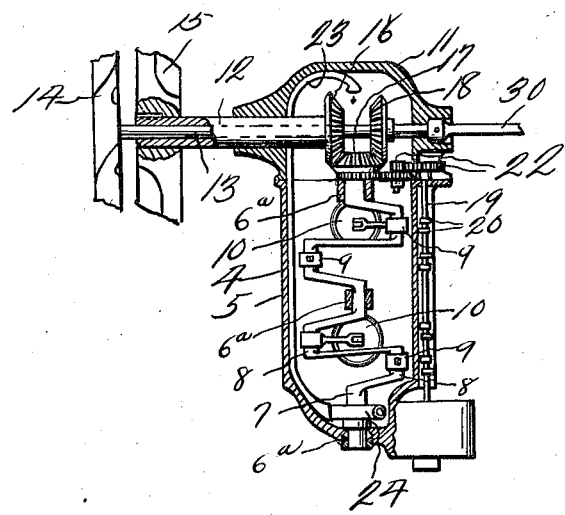

1,437,265

UNITED STATES PATENT OFFICE.

RAMÓN ORIOL, OF MANILA, PHILIPPINE ISLANDS.

AIRCRAFT ENGINE.

Application filed February 24, 1921. Serial No. 447,437.

*To all whom it may concern:*

Be it known that I, RAMÓN ORIOL, a citizen of the United States, residing at Manila, Philippine Islands, have invented a new and useful Aircraft Engine; and I do hereby declare the following to be a full, clear, and exact description of the invention, such as will enable others skilled in the art to which it appertains to make and use the same.

The invention relates to aircraft engines and has for its object to provide an engine, the cylinders of which are opposed and work horizontally on a vertically disposed crank shaft, thereby allowing the use of a two, four, six, eight, ten or any number of cylinders, and still have all of the cylinders in direct air cooling position.

A further object is to provide a vertically disposed engine having a vertically disposed crank shaft and horizontally disposed cylinders, thereby allowing the concentration of the weight nearer the center of gravity of the aircraft. Also to obtain a lower center of gravity.

A further object is to so construct the engine so that two propellers may be revolved in opposite direction by simple mechanism. Also by so constructing the engine allowing the spark plugs, manifolds, wiring etc., to be protected against the outside elements by placing the same behind the crank casings of the cylinders.

A further object is to provide propeller driving shafts telescopically engaging each other and extending into the upper end of the engine casing, said shafts being provided with bevel gears which bevel gears mesh with a bevel gear carried by the upper end of the crank shaft thereby providing a mechanism wherein the propellers will be driven in opposite direction.

A further object is to provide lubricating means for the propeller shaft driving gearing. Also to provide gear means for operating the valve cam shaft from the crank shaft.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a side elevation of a conventional form of airplane showing the engine applied thereto, and showing the cylinders of the air cooled type disposed outside the fuselage.

Figure 2 is a view similar to Figure 1 but showing a water cooled type of engine.

Figure 3 is a side elevation of a hydroplane, showing the engine used as a pusher type and disposed between struts of the planes.

Figure 4 is an enlarged top plan view of the air cooled engine.

Figure 5 is a front elevation of the air cooled engine.

Figure 6 is an enlarged side elevation of the air cooled engine.

Figure 7 is a vertical sectional view through the engine taken on line 7—7 of Figure 5.

Figure 8 is a top plan view of the water cooled engine, one of the horizontal cylinders thereof being broken away to more clearly illustrate the structure.

Referring to the drawings, the numeral 1 designates a conventional form of airplane and 2 the planes thereof. It has been found that where engines are horizontally disposed in the front compartment of the fuselage 3, that where the cylinders are multiplied that the center of gravity shifts according to the number of cylinders of the engine and consequent re-arrangement of positions of the operators. To overcome this difficulty a vertically disposed engine 4 is provided, which engine may be of the air cooled type as shown in Figures 1, 3, and 4 or of the water cooled type 4ª as shown in Figures 2, and 8. The engine 4 comprises a crank casing 5, which crank casing has extending outwardly from its side and in horizontal position, cylinders 6, which cylinders are of the air cooled type and extending outwardly from the fuselage as shown in Figure 1, thereby being in a position where they will be cooled as the machine advances through the air and at the same time so positioned that the machine may be driven by an engine of any number of cylinders without materially varying the center of gravity. Rotatably mounted in bearings 6 of the crank casing 5 is a vertically disposed crank shaft 7, to the cranks 8 of which connecting rods 9 are attached. The connecting rods 9 having their outer ends pivotally connected to pistons 10 which are disposed in the cylinders 6. The upper end of the crank casing 5 terminates in the gear casing 11, in which casing is disposed horizontal propeller driving shafts 12 and 13. The shaft 13 extends through the shaft 12 and is adapted to be rotated in the opposite direction to the direction of the shaft 12 so that its propeller 14 carried by the shaft 13 will be oppositely rotated in relation to the propeller 15 carried by the shaft 12. Secured to the rear end of the hollow shaft 12 is a bevel gear which meshes with a bevel gear 17 carried by the upper end of the crank shaft 7 and through the medium of which gears, the propeller shaft 12 is rotated. The propeller shaft 13 is rotated in an opposite direction to the direction of rotation of the shaft 12 by means of bevelled gear 18 which also meshes with the bevel gear 17 at the opposite side from the meshing point of the bevel gear 16. It will be seen that as the crank shaft 7 rotates that the gears 16 and 18 will be rotated in opposite directions thereby rotating the propellers 14 and 15 in opposite directions.

The rear side of the crank casing 5 has rotatably mounted in bearings thereof, a conventional form of cam shaft 19, which cam shaft is provided with spaced cams 20 which engage and operate conventional forms of valve rods 21 for controlling the intake and exhaust valves of the various cylinders, said cam shaft 19 is rotated through a gear train 22, which connects the upper end of the crank shaft 7 and the upper end of the cam shaft 19 together, at a point adjacent the propeller shaft drive wheel, thereby bunching all of the gearing together adjacent the propeller shaft driving gears. The object in bunching the gearing adjacent the upper end of the casing is to allow the same to be lubricated through a single pipe 23 through which lubricant is pumped from a conventional form of oil pump 24 disposed in the bottom of the chamber of the crank casing 5.

By referring to Figure 6, which is the side view of the air cooled engine and to Figure 4, it will be seen that the carbureter 25, manifold 26 and the spark plugs 27 are located to the rear of the engine and within the fuselage 3, thereby shielding the same against the action of the outside elements and protecting wiring from the weather, thereby reducing the short circuiting to a minimum.

The construction of the water cooled engine is substantially the same as that shown in the air cooled with the exception that cylinders are provided with a water jacket 28, and that the engine 4ᵃ is located within the fuselage body and that a conventional form of radiator 4ᵇ is provided at the forward end of the fuselage 3, through which radiator a cooling fluid circulates.

By referring to Figure 3, in which figure the hydroplane is shown, it will be seen that the improved engine may be used above the fuselage and supported within the struts and is shown in said figure as a pusher type of machine. However, it is to be understood that the engine may be supported between the forward struts and a puller type of hydroplane. Any form of cranking device may be used for purposes of illustration and a conventional form of crank 30 is shown.

From the above it will be seen that an air craft engine is provided which will allow the concentration of the weight adjacent the center of gravity of the fuselage, thereby increasing the stability of the craft as a whole, and also allowing the construction of engines for aircrafts, having various numbers of cylinders, which cylinders are positioned so that they will be exposed to the air and one wherein, no matter how many cylinders the engine may have, the horizontal cross sectional area of the engine will not be materially increased or diminished. The engine is so constructed that it may be utilized in any type of machine, therefore it will be seen that an engine is provided for aircraft, which is adapted for use in all types of craft.

The invention having been set forth what is claimed as new and useful is:—

The combination with an airplane fuselage, of an engine therefor, said engine comprising a casing located forwardly of the fuselage having a vertically disposed crank shaft therein, horizontally disposed superimposed cylinders carried by the casing and extending outwardly therefrom, said cylinders extending transversely in relation to the fuselage, pistons disposed in the cylinders and having connections with the crank shaft, a tubular propeller shaft rotatably mounted in a bearing at the upper end of the casing and horizontally disposed, a bevel gear carried by the inner end of the tubular propeller shaft and meshing with a gear carried by the crank shaft, a second propeller shaft rotatably mounted in the tubular propeller shaft, said second propeller shaft having secured thereto a bevelled gear, which bevelled gear meshes with the crank shaft gear at the opposite side to the point of meshing of the bevel gear of the tubular propeller shaft.

In testimony whereof I have signed my name to this specification in the presence of two subscribing witnesses.

RAMÓN ORIOL.

Witnesses:
 CARMEN R. DE ORIOL,
 A. FELICIANO,